US012180124B2

(12) United States Patent
Thompson

(10) Patent No.: US 12,180,124 B2
(45) Date of Patent: Dec. 31, 2024

(54) FERTILIZER COMPOSITIONS HAVING SLOW-RELEASE NITROGEN COMPOUNDS AND METHODS OF FORMING THEREOF

(71) Applicant: OMS Investments, Inc., Los Angeles, CA (US)

(72) Inventor: Harold E. Thompson, Powell, OH (US)

(73) Assignee: OMS Investments, Inc., Los Angeles, CA (US)

( * ) Notice: Subject to any disclaimer, the term of this patent is extended or adjusted under 35 U.S.C. 154(b) by 222 days.

(21) Appl. No.: 17/403,475

(22) Filed: Aug. 16, 2021

(65) Prior Publication Data

US 2021/0371349 A1 Dec. 2, 2021

Related U.S. Application Data

(62) Division of application No. 16/393,164, filed on Apr. 24, 2019, now Pat. No. 11,091,404.

(60) Provisional application No. 62/662,571, filed on Apr. 25, 2018.

(51) Int. Cl.
*C05C 9/02* (2006.01)
*C05G 3/90* (2020.01)
*C05G 5/23* (2020.01)

(52) U.S. Cl.
CPC ............... *C05C 9/02* (2013.01); *C05G 3/90* (2020.02); *C05G 5/23* (2020.02)

(58) Field of Classification Search
CPC ..... C05C 9/02; C05G 3/90; C05G 5/23; Y02P 60/21
See application file for complete search history.

(56) References Cited

U.S. PATENT DOCUMENTS

| 6,048,378 A * | 4/2000 | Moore ............ C05C 9/02 71/64.11 |
| 2005/0003980 A1* | 1/2005 | Baker ............ D06L 1/04 510/276 |
| 2019/0270064 A1* | 9/2019 | Postma ............ A61K 8/04 |
| 2019/0276376 A1* | 9/2019 | Schneider ............ A01C 21/00 |

FOREIGN PATENT DOCUMENTS

| CA | 2567262 A1 * | 5/2017 |
| CN | 103772074 B * | 8/2015 |

OTHER PUBLICATIONS

Steinhof, Oliver, et al. "Quantitative and qualitative 1H, 13C, and 15N NMR spectroscopic investigation of the urea-formaldehyde resin synthesis." Magnetic Resonance in Chemistry 52.4 (2014): 138-162. (Year: 2014).*

(Continued)

*Primary Examiner* — Jennifer A Smith

(57) ABSTRACT

Methods of forming a fertilizer composition having slow-release nitrogen compounds with a molten process are disclosed. The methods include mixing of a crystalline polyethylene wax with urea and formaldehyde to form a molten methylene urea mixture. The contents of the molten methylene urea mixture react to form slow-release nitrogen compounds. Fertilizer compositions formed of or including the slow-release nitrogen compounds are also disclosed.

18 Claims, 3 Drawing Sheets

(56) References Cited

OTHER PUBLICATIONS

SSAC222. "Lecture 08" Slow release N fertilizers—coated fertilizers—types of coating—lac coatedneem cake blended and coal tar coated urea-chemically modified forms-urea formaldehyde, IBDU, CDU. <http://eagri.org/eagri50/SSAC222/index.html> Jan. 10, 2017 (Year: 2017).*

Park, Byung-Dae, and Jae-Woo Kim. "Dynamic mechanical analysis of urea-formaldehyde resin adhesives with different formaldehyde-to-urea molar ratios." Journal of applied polymer science 108.3 (2008): 2045-2051. (Year: 2008).*

* cited by examiner

FERTILIZER COMPOSITIONS HAVING SLOW-RELEASE NITROGEN COMPOUNDS AND METHODS OF FORMING THEREOF

CROSS-REFERENCE TO RELATED APPLICATIONS

The present application is a divisional of U.S. patent application Ser. No. 16/393,164, filed Apr. 24, 2019, which claims the priority benefit of U.S. Provisional Patent App. Ser. No. 62/662,571, filed Apr. 25, 2018, each of which is incorporated by reference herein in their respective entireties.

TECHNICAL FIELD

The present disclosure relates generally to fertilizer compositions having slow-release nitrogen compounds and methods of making such fertilizer compositions with a molten process.

BACKGROUND

It is desirable for fertilizer compositions to include slow-release nitrogen compounds to provide plants with an extended release of nutrients, minimize leaching of nutrients into the ground, and minimize the number of fertilizer applications required for optimal plant growth. However, conventional production of slow-release nitrogen compounds suffer from a number of undesirable attributes. For example, conventional production of slow-release nitrogen compounds, such as by aqueous processes or by coating processes, can have complicated production processes with multiple time consuming steps, be energy intensive, and form a blend of nitrogen compounds having undesirable ratios of desirable slow-release nitrogen compounds to other nitrogen compounds such as cold-water insoluble nitrogen compounds.

SUMMARY

According to one embodiment, a method of forming a fertilizer composition having slow-release nitrogen compounds includes mixing urea, formaldehyde, and polyethylene wax at a first temperature to form a molten methylene urea mixture, increasing the temperature of the molten methylene urea mixture to a reaction temperature to initiate a reaction of the urea and the formaldehyde to form a fertilizer composition, and heat treating the fertilizer composition at a second temperature above the reaction temperature.

According to another embodiment, a method of forming a fertilizer composition having slow-release nitrogen compounds includes mixing urea, formaldehyde, and polyethylene wax at a first temperature to form a molten methylene urea mixture, maintaining the molten methylene urea mixture at the first temperature to form a fertilizer composition from the reaction of the urea and the formaldehyde, and heat treating the fertilizer composition at a second temperature above the first temperature.

According to another embodiment, a fertilizer composition includes slow-release nitrogen compounds. The slow-release nitrogen compounds include at least one of methylenediurea ("MDU") and dimethylenetriurea ("DMTU"). The at least one of MDU and DMTU include about 35% or more of the total nitrogen in the fertilizer composition. The fertilizer composition exhibits at least one of: (a) a complex viscosity of about 0.1 PaS to about 0.20 PaS when measured at a temperature of about 150° C.; (b) a dynamic (absolute) viscosity of about 0.02 Pas to about 0.06 Pas when measured at a temperature of about 150° C.; and (c) a viscous modulus of about 0.5 Pa to about 1.2 Pa when measured at a temperature of about 150° C.

According to another embodiment, a fertilizer composition includes slow-release nitrogen compounds. The slow-release nitrogen compounds consist essentially of methylenediurea ("MDU"), dimethylenetriurea ("DMTU"), and cold-water insoluble nitrogen. The MDU and DMTU include about 35% or more of the total nitrogen in the fertilizer composition. The cold-water insoluble nitrogen includes about 1% to about 15% of the total nitrogen in the fertilizer composition. The fertilizer composition exhibits at least one of (a) a complex viscosity of about 0.1 PaS to about 0.20 PaS when measured at a temperature of about 150° C.; (b) a dynamic (absolute) viscosity of about 0.02 Pas to about 0.06 Pas when measured at a temperature of about 150° C.; and (c) a viscous modulus of about 0.5 Pa to about 1.2 Pa when measured at a temperature of about 150° C.

According to another embodiment, a fertilizer composition is formed from a process including mixing urea, formaldehyde, and polyethylene wax at a first temperature to form a molten methylene urea mixture, increasing the temperature of the molten methylene urea mixture to a reaction temperature to initiate a reaction of the urea and the formaldehyde to form a fertilizer composition, and heat treating the fertilizer composition at a second temperature above the reaction temperature.

According to another embodiment, a fertilizer composition is formed from a process including mixing urea, formaldehyde, and polyethylene wax at a first temperature to form a molten methylene urea mixture, maintaining the molten methylene urea mixture at the first temperature to form a fertilizer composition from the reaction of the urea and the formaldehyde, and heat treating the fertilizer composition at a second temperature above the first temperature.

DETAILED DESCRIPTION

Figure 1:
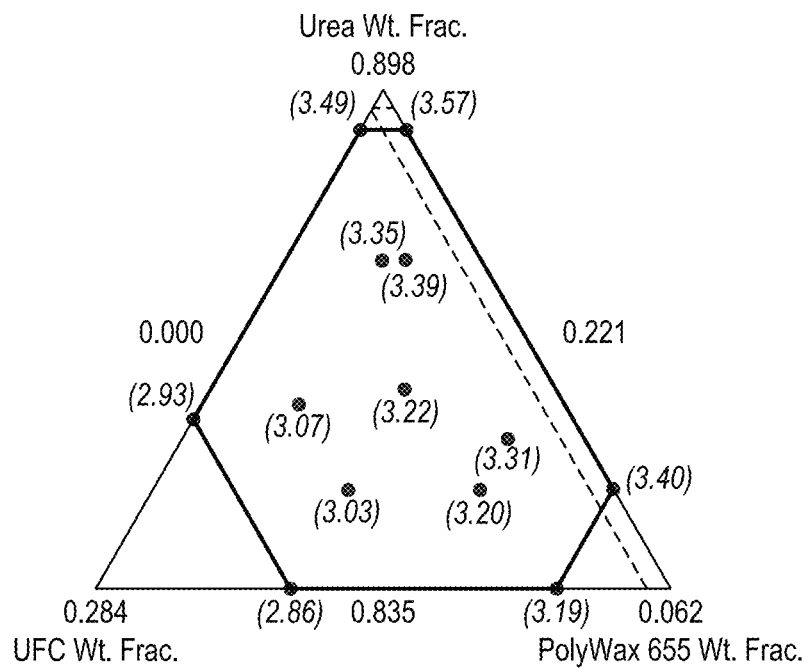
FIG. 1 depicts a contour plot illustrating the ratio of urea to formaldehyde in several example compositions.

The present disclosure generally describes methods of forming fertilizer compositions having slow-release nitrogen compounds using a molten process. As used herein, slow-release nitrogen compounds mean nitrogen compounds which provide a slower and/or longer duration release of nitrogen to plants after the compounds are applied to plants. Generally, fertilizers including slow-release nitrogen compounds can make nitrogen available to plants over a period of weeks to months. The slow-release nitrogen compounds formed from the methods generally described in the present disclosure include desirable short-chain methylene urea products such as methylenediurea ("MDU") and dimethylenetriurea ("DMTU") as well as longer-chain cold-water insoluble nitrogen compounds.

As can be appreciated, slow-release nitrogen compounds such as MDU and DMTU can be formed from chain building of urea and formaldehyde under molten conditions. Under such conditions, urea and formaldehyde can undergo a series of reactions which produce methylene urea products having varying chain lengths. For example, a urea molecule can react with a formaldehyde molecule to produce a monomethylol urea molecule. The monomethylol urea molecule can then react with another urea molecule to form methylenediurea or MDU. As can be appreciated, continued reaction of the urea molecules, formaldehyde molecules, and monomethylol urea molecules can produce methylene urea products having longer chain lengths including dimethylenetriurea, trimethylene tetraurea, etc. These reactions can occur at a reaction temperature of molten urea and molten formaldehyde. According to certain embodiments, the reaction temperature can occur a temperature range of about 110° C. to about 140° C., a temperature range of about 120° C. to about 135° C., or a temperature of about 129° C. As used herein, a molten state means a partially molten state, a substantially molten state, or an entirely molten state. Temperatures are measured at standard pressure (e.g., at about 1 atm) unless otherwise noted.

As can be appreciated however, methylene urea products having chain lengths longer than MDU and DMTU can be considered to be cold-water insoluble nitrogen compounds because such compounds have limited water solubility when used as a fertilizer. Generally, cold-water insoluble nitrogen compounds are undesirable because such compounds do not readily make nitrogen available to plants and fail to provide a meaningful fertilizing benefit. Conversely, MDU and DMTU are considered desirable because they provide a balanced measure of water solubility and advantageously make nitrogen available to plants over a period of weeks to months.

The methods described herein can form desirable slow-release nitrogen compounds, such as MDU and DMTU, in advantageous ratios with other nitrogen-containing compounds such as cold-water insoluble nitrogen compounds. Generally, the molten process can produce such desirable ratios of slow-release nitrogen compounds through the inclusion of a resin modifier to a molten mixture of urea and formaldehyde.

Specifically, it has been discovered that the inclusion of a suitable resin modifier to a molten mixture of urea and formaldehyde can hinder the reactivity of molten urea and formaldehyde to form methylene urea reaction products. Advantageously, the lowered reaction kinetics caused by the resin modifier can favor the formation of desirable short-chain methylene urea reaction products including MDU and DMTU and disfavor the formation of longer chain, cold-water insoluble nitrogen compounds.

For example, the molten process described herein can form a mixture of reaction products having about 30%, or more, of the total nitrogen be at least one of MDU and DMTU in certain embodiments, about 35%, or more, of the total nitrogen be at least one of MDU and DMTU in certain embodiments, about 40%, or more, of the total nitrogen be at least one of MDU and DMTU in certain embodiments, about 45%, or more, of the total nitrogen be at least one of MDU and DMTU in certain embodiments, and about 50%, or more, of the total nitrogen be at least one of MDU and DMTU in certain embodiments. In any such embodiment, about 15% or less of the total nitrogen in the mixture of reaction products can be cold-water insoluble nitrogen. For example, in certain embodiments, about 10%, or less, of the total nitrogen in the mixture of reaction products can be cold-water insoluble nitrogen and, in certain embodiments, about 8%, or less, of the total nitrogen in the mixture of reaction products can be cold-water insoluble nitrogen. In certain embodiments, about 1% to about 15% of the total nitrogen in the mixture of reaction products can be cold-water insoluble nitrogen. As illustration, about 35% of the total nitrogen in a mixture of reaction products can be at least one of MDU or DMTU and about 8%, or less, of the total nitrogen can be cold-water insoluble nitrogen.

Figure 2A:
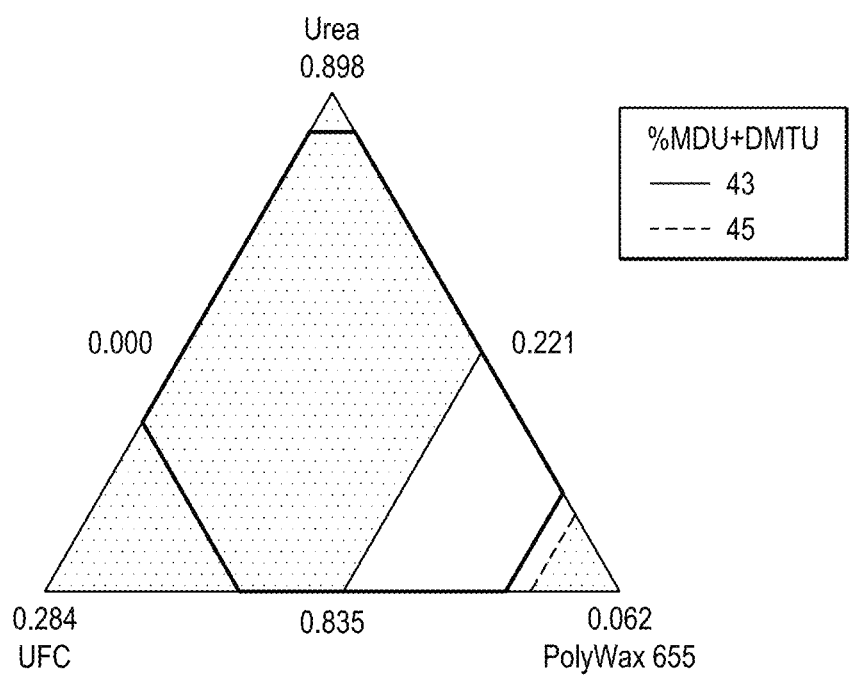
FIG. 2A depicts a contour plot illustrating the quantities of MDU and DMTU formed from the example compositions of FIG. 1.
Figure 2B:
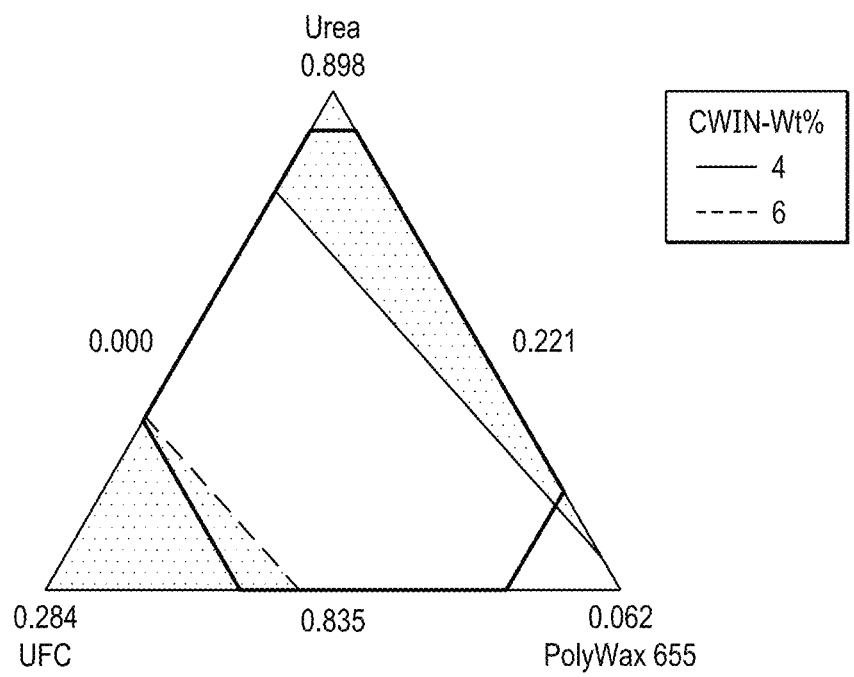
FIG. 2B depicts a contour plot illustrating the quantities of cold-water insoluble nitrogen ("CWIN") formed from the example compositions of FIG. 1.
Figure 3:
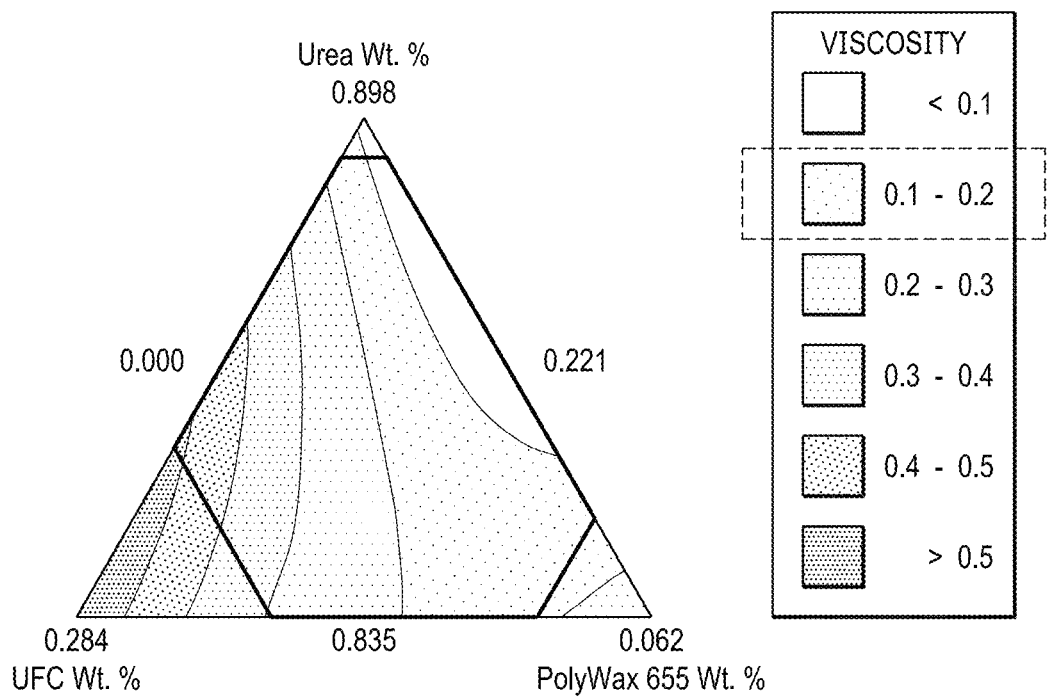
FIG. 3 depicts a contour plot illustrating the viscosity of the examples compositions of FIGS. 1, 2A, and 2B.

Generally, the distribution of reaction products can be influenced through selection of the molar ratio between urea and formaldehyde. For example, increasing the relative amount of urea to a given amount of formaldehyde can decrease the polymer chain length of the methylene urea products. By varying the molar ratio of urea and formaldehyde, specific nitrogen distribution can be obtained. In certain embodiments, suitable ratios of urea to formaldehyde to form desirable slow-release nitrogen compound distributions can vary from about 3.1:1 to about 3.35:1. FIGS. 1 to 3 show alternative ratios of urea to formaldehyde that can result in suitable slow-release nitrogen compound distributions. As can be appreciated, further alternative ratios may also be suitable by modifying the reaction conditions, reaction time, or the properties of the resin modifier.

As can be appreciated, such ratios can facilitate the formation of fertilizer compositions having desirable distributions of slow-release nitrogen compounds. In certain embodiments, the mixture of reaction products of the molten process described herein can directly be used as a fertilizer composition. Such fertilizer compositions can include desirable quantities of fast-release nitrogen compounds and desirable slow-release nitrogen compounds, such as MDU and DMTU, while including low amounts of cold-water insoluble nitrogen. As can be appreciated, unreacted urea feedstock and formaldehyde can act as a suitable source of fast-release nitrogen compounds in such embodiments.

Conversely, in other embodiments, additional processing and/or additional compounds can be added with the mixture of reaction products formed from the described molten processes to form fertilizers having slow-release nitrogen compounds.

Additional advantageous slow-release nitrogen compounds can be included in a fertilizer composition in certain embodiments. The inclusion of other types of advantageous slow-release nitrogen compounds such as triazones, urea-triazones (such as tetrahydro-s-triazone or 5-methyleneuriedo-2-oxohexahydro-s-triazine), and isobutylidene-diurea ("IBDU") can allow for tailoring of the nitrogen release profile over time. The addition of such compounds can also allow the fertilizer compositions to include any suitable amount of nitrogen. For example, in certain embodiments, the fertilizer composition containing slow-release nitrogen compounds can include from about 1% to about 99%, by weight, nitrogen. In certain embodiments, the fertilizer compositions containing slow-release nitrogen compounds can include from about 20% to about 70%, by weight, nitrogen including, for example, from about 20% to about 50%, by weight, nitrogen. In various embodiments, the amount, by weight, nitrogen in a fertilizer composition containing slow-release nitrogen compounds can be about 1%, about 2%, about 5%, about 10%, about 15%, about 20%, about 25%, about 30%, about 35%, about 40%, about 45%, about 50%, about 55%, about 60%, about 65%, about 70%, about 75%, about 80%, about 85%, about 90%, about 95%, or about 99%.

Additionally, or alternatively, various types of fast-release nitrogen compounds can be added including one or more of additional urea, urea ammonium nitrate ("UAN"), ammonium, and nitrate.

In certain embodiments, the fertilizer compositions can further include one or more non-nitrogen-based components. For example, a fertilizer composition can further include one or more of phosphorus, potassium, calcium, magnesium, manganese, molybdenum, sulfur, and zinc.

The inclusion of a resin modifier in the molten processes described herein can provide further benefits. For example, the continued presence of the resin modifier in the mixture of reaction products can reduce crystallization of the reaction products. Reduced crystallization rates can cause the mixture of reaction products to have desirable rheological properties including reduced viscosity and modulus. As can be appreciated, such rheological properties can provide numerous benefits to fertilizer compositions formed from the mixture of reaction products. For example, the rheological properties can facilitate processing, can improve stability, and can improve sprayability of fertilizers including the mixture of reaction products. Additionally, the improved rheological properties can facilitate granulation of the reaction products.

A mixture of reaction products formed from the molten process described herein and having about 35%, or more, of the total nitrogen be at least one of MDU and DMTU and 8%, or less, of the total nitrogen be cold-water insoluble nitrogen compounds, can have a complex viscosity of about 0.1 Pas to about 0.20 Pas when measured at about 150° C., and a dynamic (absolute) viscosity of about 0.02 Pas to about 0.06 Pas when measured at a temperature of about 150° C. Similarly, such a mixture of reaction products can also have a resin viscous modulus (G") of about 0.5 Pa to about 1.2 Pa when measured at about 150° C.

In certain embodiments, the inclusion of a resin modifier can also influence the rheological phase angle. For example, a mixture of reaction products formed from the molten processes described herein can have a rheological phase angle of about 72 degrees, or greater, and can have a tan delta greater than about 3.077. Such properties can indicate that the reaction products behave more like a viscous liquid than an elastic solid. As can be appreciated, conventionally produced methylene urea products can have a tan delta of about 2.144 indicating that such methylene urea products behave more like an elastic solid.

Figure 4:
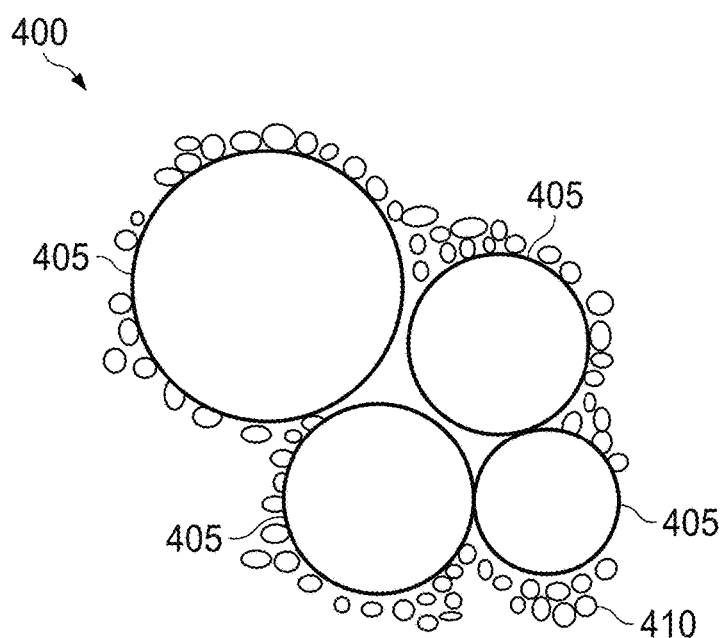
FIG. 4 depicts an illustration of a resin modifier occluding methylene urea resin products.

As can be appreciated, the resin modifier remains in the fertilizer composition after cooling of the molten reaction process. It has been advantageously discovered that the resin modifier can slow the release of nitrogen from the fertilizer compositions by occluding, or partially encapsulating, the methylene urea reaction products as illustrated in FIG. 4. Specifically, FIG. 4 depicts a fertilizer composition 400 including methylene urea reaction products 405 and resin modifier 410. The resin modifier 410 occludes, or partially encapsulates, the methylene urea reaction products 405 and can slow the release of nitrogen over time. In certain embodiments, the fertilizer compositions described herein can release nitrogen over about 60 days or greater, over about 70 days or greater, over about 80 days or greater, over about 90 days or greater, or over about 100 days or greater. Such desirable nitrogen release durations can be accomplished without inclusion of significant quantities of cold-water insoluble nitrogen or separate microencapsulation of the fertilizer compositions.

As can be appreciated, certain benefits imparted by the inclusion of a resin modifier can also be demonstrated by comparing the mixture of reaction products formed by processes including a resin modifier to the reaction products formed by a similar molten process free of any resin modifier.

For example, when producing similar amounts of cold-water insoluble nitrogen, the molten processes described herein can produce greater quantities of MDU and DMTU than a similar process free of a resin modifier. Specifically, in certain embodiments producing identical amounts of cold-water insoluble nitrogen, the molten processes described herein can form a mixture of reaction products having 45% of the total nitrogen be MDU and DMTU while a comparative process free of a resin modifier can form a mixture wherein only 34% of the total nitrogen is MDU and DMTU.

The respective mixtures also exhibit similar trends in rheological properties. For example, the reduced crystallization caused by the resin modifier can allow a mixture of resin products formed with a molten process and a resin modifier and having 45% of the total nitrogen be MDU and DMTU exhibit the same complex viscosity and resin modulus as a mixture, formed without a resin modifier, having 34% of the total nitrogen be MDU and DMTU.

Generally, suitable resin modifiers for the molten processes described herein can include crystalline polyethylene waxes which exhibit suitable physical properties in both solid and molten forms. For example, crystalline polyethylene waxes having a number average molecular weight of about 600 to about 1,200, a polydispersity index of about 1.02 to about 1.7, and about 60% to about 96% crystallinity can be suitable because such crystalline polyethylene waxes exhibit desirable hardness in solid forms and desirable viscosity ranges while in a molten form. Crystalline polyethylene waxes having molecular weight distributions and polydispersity indexes outside of such ranges can be, for example, too soft in a solid form and too viscous in the molten state. Selection of the crystalline polyethylene wax can also influence the yield and conversion rates of the molten reactions described herein.

As used herein, the polydispersity index is used to indicate the relative width, or range, of molecular weight distributions of a polymer or blend of polymers according to Formula I:

$$\text{Polydispersity index} = \frac{M_W}{M_n}$$

wherein $M_w$ is the weight average molecular weight and $M_n$ is the number average molecular weight. As can be appreciated, these values can be obtained using any known technique such as, for example, size exclusion chromatography. Materials having a greater polydispersity index can be composed of many different chain lengths. A monodisperse polymer, where all the chain lengths are equal would have a polydispersity index of 1.0.

As used herein, the degree of crystallinity is used to refer to the percentage of a polymer in the crystalline form. The degree of crystallinity can be measured by various techniques including x-ray diffraction, differential scanning calorimetry ("DSC"), and nuclear magnetic resonance ("NMR") among other techniques. In certain embodiments, suitable crystalline polyethylene waxes can have a degree of crystallinity, determined via DSC, of about 60% to about 96%. As can be appreciated, the degree of crystallinity can be determined by DSC using the equation: % Crystallinity= $[\Delta Hm-\Delta Hc]/\Delta Hm°*100\%$, where $\Delta Hm$ is the heat of melting, $\Delta Hc$ is the heat of cold crystallization, and $\Delta Hm°$ is the heat of melting of a 100% crystalline sample (e.g., 293.6 J/g for polyethylene). In certain embodiments, the crystalline polyethylene wax can have a degree of crystallinity of about 65% to about 96%, in certain embodiments, about 65% to about 80%, in certain embodiments, about 70% to about 80%, and in certain embodiments, about 76%.

In certain embodiments, suitable crystalline polyethylene waxes can have a number average molecular weight average of about 600 to about 1,000 and a polydispersity index of about 1.08 to about 1.09. As can be appreciated, more than one crystalline polyethylene wax can also, or alternatively, be used to reach the desired properties. For example, a first crystalline polyethylene wax having a molecular weight of about 600 and a second crystalline polyethylene wax having a molecular weight of about 1,000 can be used in certain embodiments.

Such crystalline polyethylene waxes can be suitable to both reduce the molten reaction kinetics of urea and formaldehyde and to reduce crystallization rates of the methylene urea reaction products. In certain embodiments, suitable crystalline polyethylene waxes can also exhibit a needle penetration hardness of about 1 mm to about 3 mm when measured at 25° C. The dynamic viscosity of a suitable crystalline polyethylene wax can be about 7 cps to about 15 cps when measured at a temperature of 150° C.

Generally, the crystalline polyethylene wax can be melted and combined in solution with the molten urea and formaldehyde to form an emulsion of two immiscible fluids which require agitation for uniformity. The emulsion hinders reactivity and can prevent excess methylene urea chain building. In certain embodiments, the crystalline polyethylene wax can be melted before addition to the molten urea and formaldehyde. In alternative embodiments, the crystalline polyethylene wax can be melted simultaneously with either of, or both of, urea and formaldehyde.

Generally, a resin modifier can be included at about 2% to about 10%, by weight, of the molten mixture. For example, in certain embodiments, about 2.5% to about 7.5%, by weight of the molten mixture can be the resin modifier. In certain embodiments, about 5%, by weight of the molten mixture can be the resin modifier.

As can be appreciated, urea and formaldehyde for the molten process can be provided in any suitable manner. For example, it can be useful in certain embodiments to provide formaldehyde in the form of a urea-formaldehyde concentrate. The use of a urea-formaldehyde concentrate can simplify processing and is widely available.

In certain embodiments, a heat treatment step can be performed after formation of the reaction products to reduce crystallization of the mixture. In such embodiments, the molten mixture of reaction products can be heated to a higher temperature before being allowed to cool. As can be appreciated, once the reaction products form a solution, it can be more difficult for the reaction products to subsequently crystallize and fall out of solution even when cooled. Additionally, during a heat treatment step, the resin modifier can also block nucleation sites which seed crystallization of the reaction products. In certain embodiments, a heat treatment step can occur at a temperature ranging from about 135° C. to about 160° C. and can have a duration of about 10 minutes. In certain embodiments, the heat treatment step can occur at a temperature ranging from about 135° C. to about 150° C. for a duration of about 10 minutes. In certain embodiments, the heat treatment step can occur at a temperature of about 138° C.

The fertilizer compositions described herein can be applied to a seed, seedling, plant, or lawn. In certain embodiments, the fertilizer compositions can be sprayed onto a soil, seed, seedling, plant, or lawn using sprayers known to one of ordinary skill in the art, such as trigger sprayers (e.g., hand-held trigger sprayers), wand sprayers, bottle sprayers, compression sprayers, tank sprayers, pump sprayers, hose-end sprayers, and backpack sprayers. The fertilizer compositions described herein can also be granulated into a solid fertilizer and applied to soil using a rotary spreader.

In certain embodiments, a fertilizer composition described herein can be applied in amounts of from about 0.1 lb. of nitrogen per 1000 $ft^2$ to about 6 lbs. of nitrogen per 1000 $ft^2$. In certain embodiments, the fertilizer compositions can be formulated as a ready-to-use or ready-to-spray formulation.

In embodiments in which the fertilizer composition is granular, the granular compositions can be applied to a soil, seed, seedling, plant or lawn by sprinkling, or spreading, the composition onto the soil, seed, seedling, plant or lawn.

As can be appreciated, the slow-release nitrogen compounds described herein can be produced by any process that includes the addition of a resin modifier to a molten mixture of urea and formaldehyde.

In certain embodiments, the process used to form the slow-release nitrogen compounds can include the step of weighing the urea and formaldehyde, or urea-formaldehyde concentrate and melting the resin modifier. In embodiments wherein the resin modifier is a crystalline polyethylene wax, the resin modifier can be melted at a temperature of 120° C. Next, the urea and urea-formaldehyde concentrate can be melted at, for example, a temperature of 104° C. In certain embodiments, it can be useful to agitate the molten mixture. In certain embodiments, the crystalline polyethylene wax can added to the urea and urea-formaldehyde concentrate as soon as the mixture melts. In such embodiments, the mixture can be held at a temperature of 119.7° C., with agitation, for 15 to 30 minutes. In certain embodiments, the molten mixture of urea, urea-formaldehyde concentrate, and the resin modifier can be held at a temperature of 129° C. for 15 minutes. During the 15 minute duration, the urea and formaldehyde in the molten mixture can form methylene urea products including MDU and DMTU. In certain embodiments, substantially all of the slow-release nitrogen compounds formed are MDU and DMTU.

As an alternative to embodiments which melt each of the components at a first temperature below the reaction temperature, each of the components (e.g., the urea, formaldehyde and resin modifier) can alternatively be melted, and mixed, at the reaction temperature and then maintained at the reaction temperature until methylene urea products are formed. Remaining steps, such as a heat treatment step, can be performed substantially unmodified.

After the reaction process is completed, a heat treatment step can be performed. In certain embodiments, a heat treatment step can include heating of the molten mixture to a temperature of 138° C. for a duration of time such as a period of about 10 minutes. The heat treatment step can reduce crystallization of the reaction products and can improve the rheological properties of the mixture.

Examples

The following examples are included to illustrate certain aspects and embodiments of the present disclosure, and are not intended to limit the disclosure to the disclosed embodiments.

Fertilizer Compositions

Several example fertilizer compositions having slow-release nitrogen fertilizer compounds were formed. In each example, a molten mixture with a total weight of 500 grams was melted at 130° C. Each molten mixture included 5%, by weight, of a crystalline polyethylene wax having a molecular weight between 600 and 1,000, a polydispersity between 1.08 and 1.09, and 76% crystallinity. The molten mixture for each example further included varying quantities of urea and urea formaldehyde concentrate.

FIGS. 1 to 3 depict contour plots illustrating, respectively, the ratios of urea to formaldehyde in various examples, a contour plot indicating the amount of MDU and DMTU formed as a percent of the total nitrogen, a contour plot indicating the amount of cold-water insoluble nitrogen (CWIN) formed, and a mixture contour plot indicating the rheological properties of the previous two graphs. In FIG. 1, the italicized numbers indicate molar ratios of urea to formaldehyde. In FIG. 3, the viscosity units are PaS.

As indicated by the graphs, molten mixtures including a ratio of urea to formaldehyde in a ratio of about 3.1:1 to about 3.35:1 formed desirable quantities of MDU and DMTU while also demonstrating low viscosity.

Greenhouse Trial

The fertilizing effect of Example 4 (a fertilizer composition prepared according to the present disclosure) was compared to Example 5 (Nutralene® 40-0-0 manufactured by the Koch Agronomic Services, LLC (Wichita, KS)). Nutralene® 40-0-0 is a commercial fertilizer including 40% total nitrogen (4% urea, 17% water soluble nitrogen, and 19% water insoluble nitrogen). The nitrogen distributions of Examples 4 and 5 are depicted in Table 1.

TABLE 1

| | Soluble Urea (%) | MDU and DMTU (%) | Cold Water Insoluble Nitrogen (%) | Slow Release Nitrogen (%) |
|---|---|---|---|---|
| Example 4 | 41 | 55 | 4 | 59 |
| Example 5 | 10 | 42.5 | 47.5 | 90 |

Examples 4 and 5 were evaluated using a greenhouse trial. In the greenhouse trial, Examples 4 and 5 were dried and milled to 20 microns and applied to 'Celebration' bermudagrass at a rate of 1.0 lbs/1000 ft². The greenhouse was set to an 85° F./70° F. day/night temperature cycle and held at 50% humidity. 1" of irrigation was delivered per week. The fertilizer response of Examples 4 and 5 was measured by determining clipping chlorophyll mass in accordance to the methods described in Baldwin, C. M., H. Liu, L. B. McCarty, H. Luo, C. Wells, and J. E. Toler, *Impact of Altered Light Spectral Quality on Warm-Season Turfgrass Growth under Greenhouse Conditions*, Crop Science Vol. 49 July-August 2009. The relative chlorophyll percentage of Examples 4 and 5 was then determined from their respective clipping chlorophyll masses and is depicted in Table 2.

TABLE 2

| | Relative Chlorophyll Percentage- Day 42 | Relative Chlorophyll Percentage- Day 84 |
|---|---|---|
| Example 4 | 73.2% | 59.4% |
| Example 5 | 81.2% | 45.2% |

As illustrated by Table 2, Example 4 maintains a relative chlorophyll percentage of greater than 50% 84 days after application to 'Celebration' bermudagrass despite having only small amounts of cold water insoluble nitrogen. As such, Example 4 exhibits a meaningful greening effect. Prior to the present disclosure, it was believed that significant quantities of cold water insoluble nitrogen, or alternative methods to slow nitrogen release such as microencapsulation, were required for a fertilizer to exhibit continued greening over such an extended duration of time (i.e., 84 days). For example, traditional fertilizers including only 4% cold water insoluble nitrogen, as present in Example 4, would be expected to exhibit substantially no greening effect at 84 days.

Scanning Electron Microscopy

Figure 5:
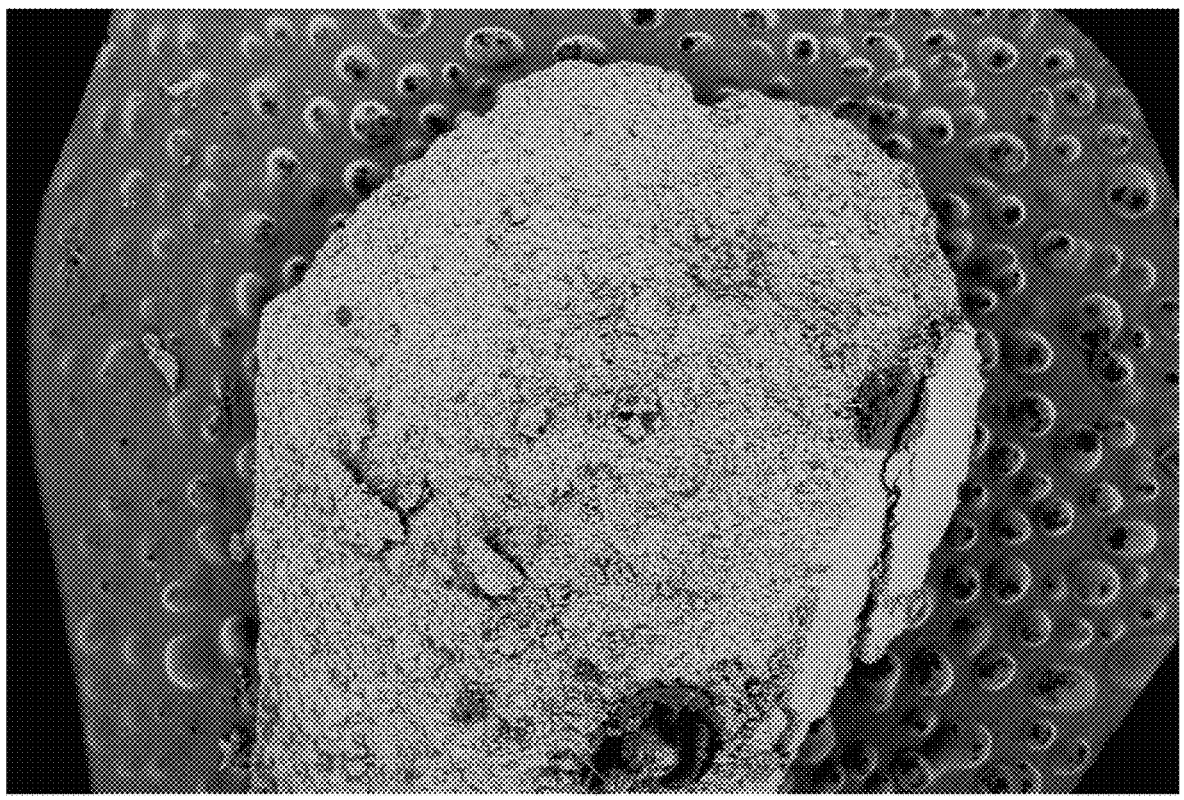
FIG. 5 is a scanning electron microscopy image of an example composition.

FIG. 5 depicts a scanning electron microscopy image of a shaved cross section of an example composition at 60 times magnification. As depicted in FIG. 5, the methylene urea reaction products are partially occluded by the polyethylene wax with dark areas showing areas of concentrated polyethylene wax, lighter areas with relatively little polyethylene wax, and mid-toned areas showing a mix of both polyethylene wax and methylene urea reaction products.

As used herein, all percentages (%) are percent by weight of the total composition, also expressed as weight/weight %, % (w/w), w/w, w/w % or simply %, unless otherwise indicated.

The dimensions and values disclosed herein are not to be understood as being strictly limited to the exact numerical values recited. Instead, unless otherwise specified, each such dimension is intended to mean both the recited value and a functionally equivalent range surrounding that value.

It should be understood that every maximum numerical limitation given throughout this specification includes every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

Every document cited herein, including any cross-referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests, or discloses any such invention. Further, to the extent that any meaning or definition of a term in this document conflicts with any meaning or definition of the same term in a document incorporated by reference, the meaning or definition assigned to that term in the document shall govern.

The foregoing description of embodiments and examples has been presented for purposes of description. It is not intended to be exhaustive or limiting to the forms described. Numerous modifications are possible in light of the above teachings. Some of those modifications have been discussed and others will be understood by those skilled in the art. The embodiments were chosen and described for illustration of various embodiments. The scope is, of course, not limited to the examples or embodiments set forth herein, but can be employed in any number of applications and equivalent articles by those of ordinary skill in the art. Rather it is hereby intended the scope be defined by the claims appended hereto.

What is claimed is:

1. A fertilizer composition comprising:
   slow-release nitrogen compounds, the slow-release nitrogen compounds comprising at least one of methylene-diurea ("MDU") and dimethylenetriurea ("DMTU"); and
   about 2% to about 10%, by weight, of a first crystalline polyethylene wax; and
   wherein the at least one of MDU and DMTU comprise about 45% or more of the total nitrogen in the fertilizer composition; and
   wherein the fertilizer composition exhibits a complex viscosity of about 0.1 Pas to about 0.20 Pas when measured at a temperature of about 150° C.

2. The fertilizer composition of claim 1, wherein the crystalline polyethylene wax at least partially occludes the slow-release nitrogen compounds.

3. The fertilizer composition of claim 1, further comprising about 8% or less cold-water insoluble nitrogen.

4. The fertilizer composition of claim 1, wherein the first crystalline polyethylene wax exhibits one or more of:
   a number average molecular weight of about 600 to about 1,200;
   a polydispersity index of about 1.02 to about 1.7; and
   a crystallinity of about 60% to about 96% as determined by differential scanning calorimetry.

5. The fertilizer composition of claim 1, wherein the first crystalline polyethylene wax has a number average molecular weight of about 600 to about 1,000.

6. The fertilizer composition of claim 1, wherein the first crystalline polyethylene wax has a polydispersity of about 1.08 to about 1.09.

7. The fertilizer composition of claim 1, wherein the first crystalline polyethylene wax has a dynamic viscosity of about 7 cps to about 15 cps when measured at a temperature of 150° C.

8. The fertilizer composition of claim 1 further comprises a second crystalline polyethylene wax.

9. The fertilizer composition of claim 1 comprises about 2.5% to about 7.5%, by weight, of the crystalline polyethylene wax.

10. The fertilizer composition of claim 1 further comprises one or more of a triazone, a urea-triazone, and isobutylidene-diurea.

11. The fertilizer composition of claim 1 further comprises one or more of phosphorus, potassium, calcium, magnesium, manganese, molybdenum, sulfur, and zinc.

12. The fertilizer composition of claim 1 exhibits one or more of:
    (a) a dynamic (absolute) viscosity of about 0.02 Pas to about 0.06 Pas when measured at a temperature of about 150° C.; and
    (b) a viscous modulus of about 0.5 Pa to about 1.2 Pa when measured at a temperature of about 150° C.

13. The fertilizer composition of claim 1 exhibits a tan delta of about 3.00 or greater.

14. The fertilizer composition of claim 1 exhibits a rheological phase angle of about 72 degrees or greater.

15. The fertilizer composition of claim 1 exhibits a complex viscosity of about 0.1 Pas to about 0.20 Pas when measured at a temperature of about 150° C.

16. The fertilizer composition of claim 1 exhibits nitrogen release over about 80 days or greater.

17. The fertilizer composition of claim 1 is sprayable.

18. A method of treating plants by applying the fertilizer composition of claim 1 to a plant.

* * * * *